United States Patent [19]

Higuchi et al.

[11] Patent Number: 5,618,768

[45] Date of Patent: Apr. 8, 1997

[54] SINTERED BODY OF SILICON NITRIDE AND COMPOSITE SINTERED BODY OF SILICON NITRIDE AND SILICON CARBIDE

[75] Inventors: Yoshikatsu Higuchi; Kazumi Miyake, both of Wako, Japan

[73] Assignee: Honda Giken Kogyo Kabushiki Kaisha, Tokyo, Japan

[21] Appl. No.: 628,486

[22] Filed: Apr. 5, 1996

[30] Foreign Application Priority Data

Apr. 7, 1995 [JP] Japan .................................... 7-082310
Apr. 12, 1995 [JP] Japan .................................... 7-111142

[51] Int. Cl.$^6$ ........................ C04B 35/596; C04B 35/599
[52] U.S. Cl. ................................. 501/92; 501/97; 501/98
[58] Field of Search ................................. 501/92, 97, 98

[56] References Cited

U.S. PATENT DOCUMENTS

| | | | |
|---|---|---|---|
| 4,826,791 | 5/1989 | Mehrotra et al. | 501/92 |
| 5,177,038 | 1/1993 | Takahashi et al. | 501/92 |
| 5,352,641 | 10/1994 | Matsui et al. | 501/92 |
| 5,494,866 | 2/1996 | Li | 501/92 |
| 5,523,267 | 6/1996 | Tanaka et al. | 501/92 |

FOREIGN PATENT DOCUMENTS

| | | |
|---|---|---|
| 63-100066 | 5/1988 | Japan . |
| 2160669 | 6/1990 | Japan . |
| 2255572 | 10/1990 | Japan . |
| 3205363 | 9/1991 | Japan . |
| 0446062 | 2/1992 | Japan . |
| 4280871 | 10/1992 | Japan . |

*Primary Examiner*—Karl Group
*Attorney, Agent, or Firm*—Birch, Stewart, Kolasch & Birch, LLP

[57] ABSTRACT

A silicon nitride sintered body formed by sintering a mixture of silicon nitride powder mixed with a combined sintering aid of aluminum nitride powder and a powder of at least one rare earth oxide selected from the group consisting of $Ce_2O_3$, $Pr_2O_3$, $Nd_2O_3$, $Dy_2O_3$, $Ho_2O_3$, $Er_2O_3$, $Tm_2O_3$, $Yb_2O_3$ and $Lu_2O_3$. Another sintered body is a composite sintered body of silicon nitride and silicon carbide formed by sintering a mixture of silicon nitride, silicon carbide, aluminum nitride and at least one rare earth oxide selected from the group consisting of $Ce_2O_3$, $Pr_2O_3$, $Nd_2O_3$, $Ho_2O_3$, $Er_2O_3$, $Tm_2O_3$, $Yb_2O_3$ and $Lu_2O_3$.

9 Claims, 1 Drawing Sheet

SINTERED BODY OF SILICON NITRIDE AND COMPOSITE SINTERED BODY OF SILICON NITRIDE AND SILICON CARBIDE

BACKGROUND OF THE INVENTION

The present invention relates to a sintered body of silicon nitride ($Si_3N_4$) with a good high-temperature strength. The present invention also relates to a composite sintered body of silicon carbide (SiC) and silicon nitride, particularly, an HIP composite sintered body with a good high-temperature strength and a high density, and a method for producing the composite sintered body.

A sintered body of silicon nitride has been expected to be used as a material for engine parts of automobiles, rotors, gas turbine parts such as shrouds and nozzles, sliding members, tools, etc. because of its high-temperature strength, high hardness and high wear resistance superior to those of the ceramics of other types.

Since silicon nitride powder is hardly sintered, a densified sintered body is usually produced by using a sintering aid such as $Y_2O_3$, $Al_2O_3$ and MgO. However, a glass phase having a low melting point likely remains in the grain boundaries of silicon nitride when such oxides are used in combination, thereby resulting in the deterioration of high-temperature strength, in particular, strength at 1200° C. or higher.

Several proposals to improve high-temperature strength of sintered body have been made.

JP-A-63-100066 discloses precipitating crystals of $XSiO_2N$ (X is a IIIa-Group element of the Periodic Table) in the grain boundary phase of silicon nitride by cooling a sintered product in a slow cooling rate. However, it is difficult to crystallize the inner portions of a sintered product when producing thick or bulky bodies, and a long cooling time is required to reduce the productivity of sintered products.

JP-A-4-46062 discloses sialon solid solutions formed from $Si_3N_4$ and the oxide constituting the grain boundary phase. However, a sintered body thus produced is still insufficient in oxidation resistance and shows a significant reduction of strength at 1300° C. or higher.

JP-A-4-280871 discloses the combined use of an oxide of a rare earth element and an oxide of a IVa-Group element such as $HfO_2$, etc. as the sintering aid. Although a sintered body thus produced is improved in strength at 1300° C. or higher to some extent, it is insufficient in fracture toughness and creep characteristics.

Because of an excellent high-temperature strength, high oxidation resistance, high wear resistance, high hardness, etc., a silicon carbide ceramic sintered body is also expected to be useful in the same applications as in the case of the silicon nitride ceramic sintered body described above. Recently, various attempts have been made to provide, in place of such monolithic sintered bodies, a composite sintered body of silicon nitride and silicon carbide having advantages of both the ingredients. Such a composite sintered body includes a silicon nitride-silicon carbide composite sintered body having nano-composite structures in which fine silicon carbide particles are dispersed in silicon nitride particles.

JP-A-2-160669 discloses the production of a silicon nitride-silicon carbide composite sintered body from an amorphous silicon nitride-silicon carbide composite powder obtained by a vapor phase reaction method. The composite sintered body has a fine structure in which silicon carbide particles having an average particle size of 1 μm or less are present along grain boundaries and silicon carbide particles as small as several nanometers to several hundreds of nanometers are dispersed in silicon nitride particles. However, since the amorphous silicon nitride-silicon carbide composite powder is decomposed during sintering, it is not easily subjected to a liquid-phase sintering. Also, since the amorphous silicon nitride-silicon carbide composite powder is extremely bulky, it is not easily molded. Accordingly, the amorphous silicon nitride-silicon carbide composite powder should practically be sintered by hot pressing, and therefore, the method of this document is not applicable to producing a product of complicated shape.

JP-A-2-255572 discloses a silicon nitride-silicon carbide composite sintered body formed by sintering a powdery mixture of silicon nitride, silicon carbide, aluminum nitride and yttria. Although this composite sintered body has β-silicon nitride phase, β-silicon carbide phase and α-sialon phase and shows a high strength at ordinary temperature, it is still insufficient in high-temperature strength, in particular at 1300° C. or higher. With respect to sintering aid, this document discloses only yttria and considers nothing as to the rare earth oxide sintering aid other than yttria which cannot provide a sintered body with a sufficient high-temperature strength as indicated above.

JP-A-3-205363 discloses a silicon nitride-silicon carbide composite sintered body formed by sintering a powder mixture of silicon nitride, silicon carbide and a compound of a rare earth element. Since the grain boundary phase of the silicon nitride particles consists essentially of a crystalline phase, the composite sintered body shows a high-temperature strength comparable to the strength at room temperature. However, the densification of the sintered body may be prevented by a slight temperature change during the sintering step due to the absence of aluminum nitride. Therefore, silicon carbide is added in a small amount to ensure a sufficient densification. However, this minimizes the effect of adding silicon carbide to silicon nitride.

OBJECT AND SUMMARY OF THE INVENTION

Accordingly, an object of the present invention is to provide a silicon nitride sintered body with a high strength and toughness at a high temperature such as 1200° C. or higher.

Another object of the present invention is to provide a densified composite sintered body of silicon nitride and silicon carbide which is excellent in high-temperature strength, and a method for producing such a composite sintered body.

It has been known in the art that $Al_2O_3$ or MgO, known as a typical sintering aid, is quite effective for densifying silicon nitride powder although it deteriorates the high-temperature strength of the resultant sintered body. It has been also known that a densified and high-strength sintered body is difficult to produce by a gas pressure sintering method or HIP (hot isostatic pressing) when $Y_2O_3$, another typical sintering aid, is used alone.

As a result of the intense research in view of the above objects, the inventors have found that a densified sintered body of silicon nitride ($Si_3N_4$) is obtained without deteriorating high-temperature strength by adding aluminum element to silicon nitride powder in the form of aluminum nitride (AlN) instead of $Al_2O_3$ which leads to a reduced high-temperature strength, together with an oxide of a particular rare earth element (rare earth oxide).

The inventors have further found that a highly densified composite sintered body of silicon nitride and silicon carbide having an excellent high-temperature strength is produced by sintering, particularly by HIP sintering a powder mixture obtained by adding an oxide of a particular rare earth element to a mixture of silicon nitride, silicon carbide and aluminum nitride.

The present invention has been accomplished based on the above findings.

Thus, in a first aspect of the present invention, there is provided a silicon nitride sintered body formed by sintering a mixture of silicon nitride powder, aluminum nitride powder and a powder of at least one rare earth oxide selected from the group consisting of $Ce_2O_3$, $Pr_2O_3$, $Nd_2O_3$, $Dy_2O_3$, $Ho_2O_3$, $Er_2O_3$, $Tm_2O_3$, $Yb_2O_3$ and $Lu_2O_3$.

In a second aspect of the present invention, there is provided a composite sintered body of silicon nitride and silicon carbide, which is produced by sintering a mixture of silicon nitride powder, silicon carbide powder, aluminum nitride powder and a powder of at least one rare earth oxide selected from the group consisting of $Ce_2O_3$, $Pr_2O_3$, $Nd_2O_3$, $Ho_2O_3$, $Er_2O_3$, $Tm_2O_3$, $Yb_2O_3$ and $Lu_2O_3$.

In a third aspect of the present invention, there is provided a method for producing a composite sintered body of silicon nitride and silicon carbide, which comprises mixing silicon nitride powder, silicon carbide powder, aluminum nitride powder and a powder of at least one rare earth oxide selected from the group consisting of $Ce_2O_3$, $Pr_2O_3$, $Nd_2O_3$, $Ho_2O_3$, $Er_2O_3$, $Tm_2O_3$, $Yb_2O_3$ and $Lu_2O_3$, and sintering the resultant powder mixture.

DETAILED DESCRIPTION OF THE INVENTION

Figure 1:
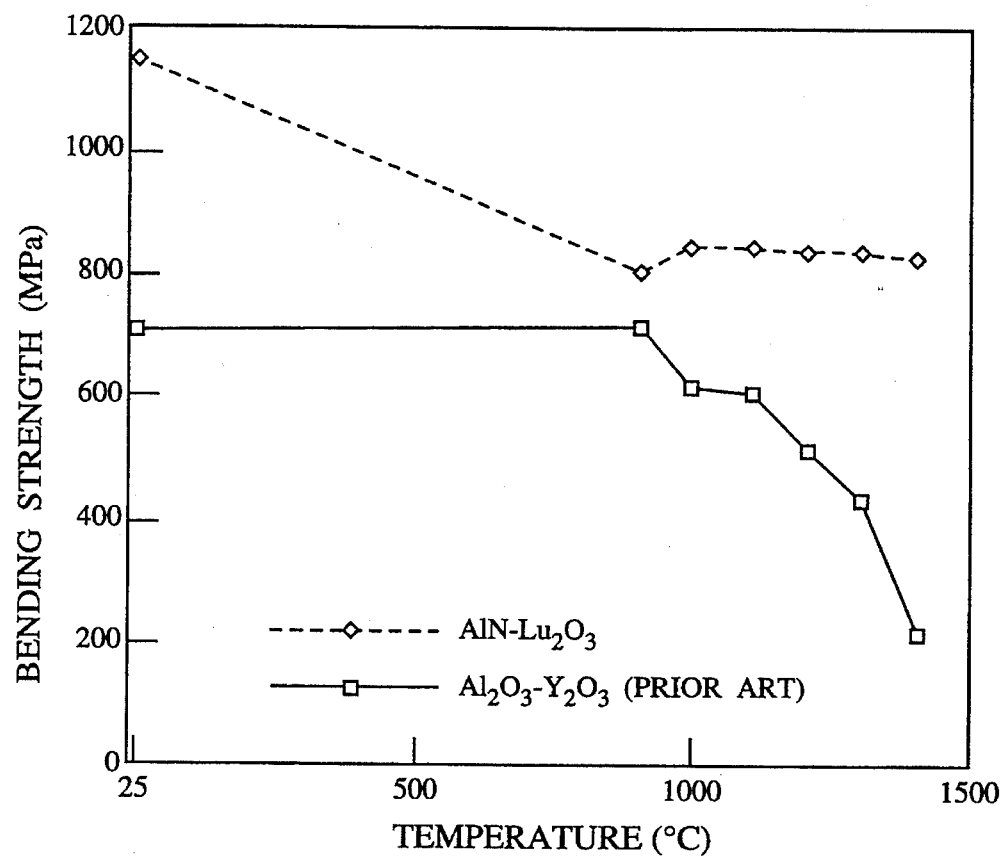
FIG. 1 is a graph showing the relation between the bending strength and the temperature of the sintered body according to the present invention and the prior art.

The present invention will be described below more in detail.

A Silicon Nitride Sintered Body

[1] Starting Material (1) $Si_3N_4$ Powder

Silicon nitride may be either $\alpha$-$Si_3N_4$ or $\beta$-$Si_3N_4$, which are produced by a known method such as a direct nitrogenation of Si, a reductive nitrogenation of silica, a thermal decomposition of silicon diimide and a vapor phase reaction of a mixture of $SiH_4$, $NH_3$ and $N_2$, preferably $\alpha$-$Si_3N_4$ produced by a thermal decomposition of silicon diimide. The addition amount of $Si_3N_4$ is preferably 70–97.5 weight %, more preferably 80–94 weight % based on the total amount of the ingredients. The average particle size of the $Si_3N_4$ powder is preferably 0.01–3 μm, more preferably 0.1–1 μm.

(2) Sintering Aid Powder

Aluminum nitride (AlN) and at least one oxide of rare earth element (rare earth oxide) selected from the group consisting of $Ce_2O_3$, $Pr_2O_3$, $Nd_2O_3$, $Dy_2O_3$, $Ho_2O_3$, $Er_2O_3$, $Tm_2O_3$, $Yb_2O_3$ and $Lu_2O_3$ are used in combination as the sintering aid. The preferable rare earth oxide may include $Tm_2O_3$, $Yb_2O_3$ and $Lu_2O_3$.

The addition amount of AlN is preferably 0.5–10 weight %, more preferably 1–5 weight % based on the total amount of the ingredients. An addition amount less than 0.5 weight % fails to provide a sintered body with a sufficient densification. An addition amount exceeding 10 weight % results in reduction of the high-temperature strength of the resultant sintered body, namely, the addition of AlN exceeding 10 weight % reduces the effect of adding aluminum element in the form of aluminum nitride. The average particle size of the AlN powder is preferably 0.1–5 μm, more preferably 0.5–3 μm.

The rare earth oxides may be used either alone or in combination of two or more. The addition amount of at least one oxide is preferably 2–20 weight %, more preferably 6–15 weight % based on the total amount of the ingredients. When the addition amount is less than 2 weight % or exceeds 20 weight %, a sintered body is not sufficiently densified, or is not sufficiently improved in strength although densified to some extent. The average particle size of the rare earth oxide powder is preferably 0.01–5 μm, more preferably 0.5–2 μm.

[2] Production Method

The silicon nitride sintered body of the present invention may be produced by a method known in the art, such as a gas pressure sintering, a HIP sintering, etc., preferably a HIP sintering which will be described below.

Although a sufficiently densified sintered body with high strength and toughness at high temperatures is not obtained when AlN or rare earth oxide is used alone, the silicon nitride sintered body of the present invention is sufficiently densified and excellent in both the strength and the toughness at high temperatures.

The silicon nitride sintered body of the present invention has the following characteristics:

Bending strength (3-point bending strength): 400–1200 MPa, preferably 700–1000 MPa at 1400° C.; and Fracture toughness: 5–12 $MPa \cdot m^{1/2+cc}$, preferably 7–10 $MPa \cdot m^{1/2}$ at room temperature.

The fracture toughness and the high-temperature strength depend on the sintering temperature. When the sintering temperature is high, the high-temperature toughness becomes higher while the fracture toughness is reduced. It may be assumed to be due to the particle size change.

B Silicon Nitride-Silicon Carbide Composite Sintered Body

[1] Starting Material (1) $Si_3N_4$ Powder

The $Si_3N_4$ powder used in the production of the composite sintered body has an average particle size of 0.01–3 μm, preferably 0.1–1.0 μm. The amount of $Si_3N_4$ is preferably 60–95 weight %, more preferably 70–85 weight % based on the total amount (100 weight %) of silicon carbide and silicon nitride. An amount exceeding 95 weight % (the ratio of $Si_3N_4$ to SiC is too high) reduces the effect of adding SiC to the $Si_3N_4$ powder, namely, the strength, the toughness and the creep characteristics are not improved. If the amount is less than 60 weight %, the resultant composite sintered body would not be made high-density.

(2) SiC Powder

The SiC powder used in the present invention has an average particle size of 0.01–1 μm, preferably 0.03–0.8 μm. The amount of SiC is preferably 5–40 weight %, more preferably 15–30 weight % based on the total amount (100 weight %) of $Si_3N_4$ and SiC. An amount less than 5 weight % reduces the effect of adding SiC to $Si_3N_4$, namely, the strength, the toughness and the creep characteristics are not improved. If the amount exceeds 40 weight %, the resultant composite sintered body would not be made high-density.

The total amount of $Si_3N_4$ and SiC is preferably 70–97.5 weight %, more preferably 80–94 weight % based on the total amount of the ingredients.

(3) AlN Powder

The average particle size of the AlN powder used for producing the composite sintered body is preferably 0.1–5 μm, more preferably 0.5–3 μm. The addition amount of AlN is preferably 0.5–10 weight %, more preferably 1–5 weight % based on the total amount of the ingredients. An addition amount exceeding 10 weight % reduces the effect of adding aluminum element in the form of aluminum nitride to result in reduction of the strength at high temperatures.

(4) Rare Earth Oxide

The rare earth oxide is selected from the group consisting of $Ce_2O_3$, $Pr_2O_3$, $Nd_2O_3$, $Ho_2O_3$, $Er_2O_3$, $Tm_2O_3$, $Yb_2O_3$ and $Lu_2O_3$, and preferably $Tm_2O_3$, $Yb_2O_3$ and $Lu_2O_3$. These oxides may be used either alone or in combination of two or more. The addition amount of at least one oxide is preferably 2–20 weight %, more preferably 5–15 weight % based on the total amount of the ingredients. When the addition amount exceeds 20 weight %, a composite sintered body with reduced strength would be obtained. An amount of less than 2 weight % would result in a composite sintered body of a low density. The average particle size of the rare earth oxide powder is preferably 0.01–5 μm, more preferably 0.5–2 μm.

[2] Production of Composite Sintered Body

(1) Forming Green Body

Each component is added in a proportion within the ranges of the present invention, and fully blended by a ball mill, a kneader, etc. The blending of the components may be conducted in a dry or wet manner. In the case of wet blending, the powder mixture is mixed with a dispersion medium such as water, ethanol, butanol, etc., preferably with ethanol.

A green body is formed from the blended mixture by a die molding, a slip casting, an injection molding, etc. In the case of injection molding, a proper organic or inorganic binder is added. The preferred organic binder may include, for instance, ethyl silicate, polyethylene glycol, polyvinyl alcohol (PVA), an acrylic emulsion, a polyurethane emulsion, etc. When a green body with complicated shape is to be formed, a slip casting and an injection molding are preferable.

(2) Sintering

In the present invention, the green body may be sintered by a gas pressure sintering, HIP sintering, etc. which can produce a sintered product with complicated shape. Of such sintering methods, HIP sintering is preferable because a high sintered density can be attained. The sintering temperature is 1600°–2200° C., preferably 1750°–2000° C. If the sintering temperature is lower than 1600° C., the resultant sintered body would have low strength and toughness due to insufficient densification. On the other hand, if the sintering temperature exceeds 2200° C., $Si_3N_4$ starts to decompose. The sintering is conducted in a non-oxidizing atmosphere, preferably a nitrogen gas atmosphere. In this case, the atmosphere gas pressure is preferably about 1–2000 kgf/$cm^2$, and the sintering time is preferably about 1–5 hours. The green body is preferably embedded in a protective powdery medium such as BN powder, a powder mixture of BN and $Si_3N_4$, etc. in a crucible for sintering. The crucible is preferably a BN crucible, a carbon crucible, a composite crucible of a carbon crucible and a BN crucible disposed inside the carbon crucible, etc., and the composite crucible is particularly preferable. After sintering, the composite sintered body is allowed to cool in a known manner.

(3) Composite Sintered Body

The crystalline phase of the composite sintered body obtained by the above method is constituted by (a) β-phase silicon nitride, (b) β-phase silicon carbide, (c) α-phase sialon and (d) grain boundary phase containing at least one rare earth element selected from the group consisting of Ce, Pr, Nd, Ho, Er, Tm, Yb, and Lu. The preferred area ratio for each phase is 40–93% for (a), 5–40% for (b), 1–50% for (c), and 0.5–10% for (d). When the α-phase sialon exists in an amount exceeding 50%, the strength and oxidation resistance of the composite sintered body would be reduced. If the area ratio of the grain boundary phase exceeds 10%, the high-temperature strength of the composite sintered body is deteriorated.

The composite sintered body of the present invention has a so-called nano-composite structure where fine SiC particles are dispersed in $Si_3N_4$ particles and grain boundaries, and, in some cases, fine $Si_3N_4$ particles are dispersed in SiC particles. Since the SiC particles have a larger thermal expansion coefficient than the $Si_3N_4$ particles, the SiC particles act to provide a compression stress to the $Si_3N_4$ particles at high temperatures, thereby improving the high-temperature strength. This effect is remarkable when the fine SiC particles are dispersed in the grain boundaries of the $Si_3N_4$ particles. Also, such dispersed fine SiC particles function as wedges to suppress the sliding of the $Si_3N_4$ particles along the grain boundaries, thereby improving the high-temperature strength and creep characteristics.

The silicon nitride-silicon carbide composite sintered body of the present invention has a bending strength (3-point bending strength) of 400–1200 MPa, preferably 700–1000 MPa at 1400° C.

The present invention will be further described while referring to the following Examples which should be considered to illustrate various preferred embodiments of the present invention.

EXAMPLE 1

An $Si_3N_4$ powder having an average particle size of 0.1 μm, an AlN powder having an average particle size of 1 μm and a rare earth oxide powder having an average particle size of 1 μm were mixed in proportions shown in Table 1. Each mixed powder (300 g) was introduced into a 2-liter pot made of an engineering plastic together with 300 g of ethanol and 600 g of silicon nitride balls to carry out ball-milling with ethanol as a dispersion medium for 16 hours. By removing ethanol by drying, mixed powder samples were obtained.

TABLE 1

| Sample No. | Si$_3$N$_4$ | AlN | Rare Earth Oxide | | HfO$_2$ | Al$_2$O$_3$ |
|---|---|---|---|---|---|---|
| | (weight %) | | | | | |
| Inventive | | | | | | |
| 1 | 86.5 | 3.0 | Ce$_2$O$_3$ | 10.5 | 0 | 0 |
| 2 | 86.5 | 3.0 | Pr$_2$O$_3$ | 10.5 | 0 | 0 |
| 3 | 86.5 | 3.0 | Nd$_2$O$_3$ | 10.5 | 0 | 0 |
| 4 | 85.5 | 3.0 | Dy$_2$O$_3$ | 11.5 | 0 | 0 |
| 5 | 85.0 | 3.0 | Ho$_2$O$_3$ | 12.0 | 0 | 0 |
| 6 | 85.0 | 3.0 | Er$_2$O$_3$ | 12.0 | 0 | 0 |
| 7 | 85.0 | 3.0 | Tm$_2$O$_3$ | 12.0 | 0 | 0 |
| 8 | 85.0 | 3.0 | Yb$_2$O$_3$ | 12.0 | 0 | 0 |
| 9 | 84.5 | 3.0 | Lu$_2$O$_3$ | 12.5 | 0 | 0 |
| Comparative | | | | | | |
| 10 | 92.0 | 0 | Y$_2$O$_3$ | 5.0 | 3 | 0 |
| 11 | 92.0 | 0 | Y$_2$O$_3$ | 6.0 | 0 | 2 |

Figure 2:
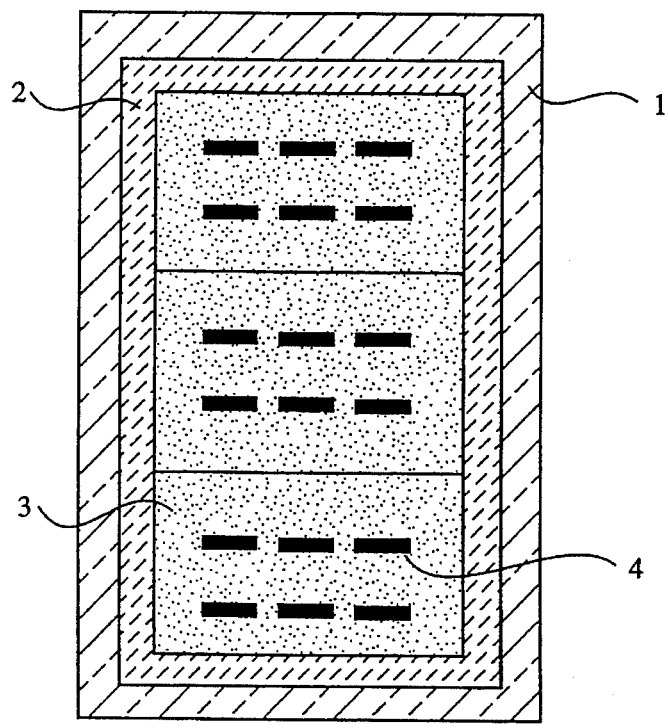
FIG. 2 is a cross-sectional view schematically showing a HIP-sintering crucible for use in the production of the composite sintered body according to the present invention.

Each sample powder was pre-molded by a die press at 200 kgf/cm$^2$, and then subjected to CIP at an isostatic pressure of 4 tons/cm$^2$ to form a green body of 30 mm×50 mm×6 mm. Then, as shown in FIG. 2, each green body 4 was embedded in a protective powder medium 3 (a 1:1 mixture (weight ratio) of Si$_3$N$_4$ and BN) in a BN crucible 2. The BN crucible 2 was then placed in a carbon crucible 1 to carry out a HIP sintering in a nitrogen gas atmosphere at the maximum pressure of 1000 atms and the maximum temperature of 1850° C., thereby producing each silicon nitride sintered body.

According to JIS R-1601, each composite sintered body was cut to 3 mm×4 mm×40 mm to carry out a three-point bending test at room temperature, 1200° C. and 1400° C. under the condition of a 30-mm span and a cross head speed of 0.5 mm/minute. Fracture toughness test was carried out according to SENB (Single Edge Notched Beam) method with a notch of 0.5 mm depth and 0.1 mm width at room temperature. The creep test was carried out at 1300° C. in the same manner as the three-point bending test of JIS R-1601 to measure the time taken until each sample was broken under a breaking stress of 400 MPa. When the sample was not broken even after the passage of 200 hr, the test was repeated by changing the breaking stress to 600 MPa. The results are shown in Table 2.

TABLE 2

| Sample No. | 3-Point Bending Strength (MPa) | | |
|---|---|---|---|
| | Room Temp. | 1200° C. | 1400° C. |
| Inventive | | | |
| 1 | 870 | 652 | 503 |
| 2 | 1011 | 648 | 524 |
| 3 | 1103 | 632 | 513 |
| 4 | 892 | 683 | 572 |
| 5 | 844 | 713 | 604 |
| 6 | 951 | 698 | 650 |
| 7 | 1022 | 746 | 723 |
| 8 | 1093 | 762 | 711 |
| 9 | 1160 | 851 | 832 |

TABLE 2-continued

| Comparative | | | |
|---|---|---|---|
| 10 | 760 | 851 | 567 |
| 11 | 703 | 532 | 202 |

| Sample No. | Fracture Toughness at Room Temp. (MPa · m$^{1/2}$) | Creep Test at 1300° C. (Time (hr) taken until broken) | |
|---|---|---|---|
| | | 400 MPa | 600 MPa |
| Inventive | | | |
| 1 | 8.2 | 3 | — |
| 2 | 8.2 | 2 | — |
| 3 | 8.4 | 12 | — |
| 4 | 8.1 | 8 | — |
| 5 | 8.6 | 32 | — |
| 6 | 8.2 | 29 | — |
| 7 | 8.4 | not broken* | 9 |
| 8 | 8.6 | not broken* | 16 |
| 9 | 8.0 | not broken* | 108 |
| Comparative | | | |
| 10 | 3.4 | 1.5 | — |
| 11 | 8.6 | broken immediately | — |

Note:
*Not broken even after 200 hr.

As seen from Table 2, Sample No. 10, where Y$_2$O$_3$ and HfO$_2$ were added, was improved in the high-temperature strength, but showed a poor fracture toughness and resistance to creep rupture. Sample No. 11 added with Y$_2$O$_3$ and Al$_2$O$_3$ was improved in fracture toughness, but showed a poor high-temperature strength and was immediately broken under a creep stress of 400 MPa at 1300° C.

In the present invention, since both the rare earth oxide (Ce$_2$O$_3$, Pr$_2$O$_3$, Nd$_2$O$_3$, Dy$_2$O$_3$, Ho$_2$O$_3$, Er$_2$O$_3$, Tm$_2$O$_3$, Yb$_2$O$_3$ or Lu$_2$O$_3$) and AlN were added as the sintering aid, the high-temperature strength, fracture toughness and resistance to creep rupture were all improved simultaneously (Sample Nos. 1–9).

Table 2 also showed that Lu$_2$O$_3$ was the most effective for improving the high-temperature strength and creep characteristics. Then, Sample No. 9 containing AlN and Lu$_2$O$_3$ as the sintering aid and Sample No. 11 containing Al$_2$O$_3$ and Y$_2$O$_3$ were compared with respect to the change of the bending strength with increasing temperature (by a 3-point bending test according to JIS R-1601). The results are shown in FIG. 1.

As seen from FIG. 1, the bending strength of the present invention (AlN-Lu$_2$O$_3$) was not appreciably decreased even when the temperature reached 1200° C. or higher, while steeply decreased in Sample No. 11 when the temperature reached about 900° C.

From Table 2 and FIG. 1, it was confirmed that the rare earth oxide, in particular Lu$_2$O$_3$, was excellent as the sintering aid.

Next, the three-point bending test and the fracture toughness test were repeated in the same manner as above to determine the optimum addition amount of AlN and Lu$_2$O$_3$. The results are shown in Tables 3 and 4.

TABLE 3

| Si$_3$N$_4$ | AlN | Lu$_2$O$_3$ | 3-Point Bending Strength at 1400° C. (MPa) | Fracture Toughness at Room Temp. (MPa · m$^{1/2}$) |
|---|---|---|---|---|
| 87.5 | 0 | 12.5 | not densified | — |
| 87.0 | 0.5 | 12.5 | 710 | 7.6 |

TABLE 3-continued

| $Si_3N_4$ | AlN | $Lu_2O_3$ | 3-Point Bending Strength at 1400° C. (MPa) | Fracture Toughness at Room Temp. (MPa · m$^{1/2}$) |
|---|---|---|---|---|
| 86.5 | 1 | 12.5 | 838 | 8.1 |
| 84.5 | 3 | 12.5 | 832 | 8.0 |
| 82.5 | 5 | 12.5 | 824 | 8.3 |
| 77.5 | 10 | 12.5 | 762 | 7.8 |
| 72.5 | 15 | 12.5 | 425 | 6.1 |

TABLE 4

| $Si_3N_4$ | AlN | $Lu_2O_3$ | 3-Point Bending Strength at 1400° C. (MPa) | Fracture Toughness at Room Temp. (MPa · m$^{1/2}$) |
|---|---|---|---|---|
| 97 | 3 | 0 | not densified | — |
| 96 | 3 | 1 | 330 | 6.2 |
| 95 | 3 | 2 | 703 | 6.9 |
| 92 | 3 | 5 | 783 | 7.9 |
| 84.5 | 3 | 12.5 | 832 | 8.0 |
| 77 | 3 | 20 | 727 | 8.0 |
| 72 | 3 | 25 | 483 | 6.6 |

As seen from Table 3, it was confirmed that AlN was preferred to be added in an amount of 0.5–10 weight % based on the total weight of the ingredients. Further, the preferred addition amount of $Lu_2O_3$ was determined from Table 4 to be 2–20 weight % based on the total weight of the ingredients. The same results were obtained in the other rare earth oxides.

As described above, a silicon nitride sintered body with a high strength at high temperatures and a high fracture toughness may be obtained by using AlN and the rare earth oxide as the sintering aid.

EXAMPLE 2

In the same manner as in Example 1, each composite sintered body of silicon nitride and silicon carbide was produced from a respective powder mixture consisting of an $Si_3N_4$ powder having an average particle size of 0.1 μm, an SiC powder having an average particle size of 0.2 μm, an AlN powder having an average particle size of 1 μm and a rare earth oxide powder having an average particle size of 1 μm in proportions as shown in Table 5.

TABLE 5

| | (weight % based on total composition) | | | | |
|---|---|---|---|---|---|
| Sample No. | $Si_3N_4$ | SiC | AlN | Rare Earth | Oxide |
| Inventive | | | | | |
| 12 | 60.8 | 26.0 | 3.0 | $Ce_2O_3$ | 10.2 |
| 13 | 60.8 | 26.0 | 3.0 | $Pr_2O_3$ | 10.2 |
| 14 | 60.6 | 26.0 | 3.0 | $Nd_2O_3$ | 10.4 |
| 15 | 59.7 | 25.6 | 3.0 | $Ho_2O_3$ | 11.7 |
| 16 | 59.6 | 25.6 | 3.0 | $Er_2O_3$ | 11.8 |
| 17 | 59.6 | 25.5 | 3.0 | $Tm_2O_3$ | 12.0 |
| 18 | 59.5 | 25.5 | 3.0 | $Yb_2O_3$ | 12.0 |
| 19 | 59.1 | 25.4 | 3.0 | $Lu_2O_3$ | 12.5 |
| Comparative | | | | | |
| 20 | 60.8 | 26.1 | 3.0 | $La_2O_3$ | 10.1 |
| 21 | 60.3 | 25.9 | 3.0 | $Sm_2O_3$ | 10.8 |
| 22 | 60.1 | 25.7 | 3.0 | $Gd_2O_3$ | 11.2 |
| 23 | 60.0 | 25.7 | 3.0 | $Tb_2O_3$ | 11.3 |
| 24 | 63.0 | 27.0 | 3.0 | $Y_2O_3$ | 7.0 |

The three-point bending test, fracture toughness test and creep test were conducted in the same manner as in Example 1. The results are shown in Table 6.

TABLE 6

| | 3-Point Bending Strength (MPa) | | |
|---|---|---|---|
| Sample No. | Room Temp. | 1200° C. | 1400° C. |
| Inventive | | | |
| 12 | 683 | 526 | 458 |
| 13 | 1166 | 921 | 444 |
| 14 | 1326 | 985 | 572 |
| 15 | 880 | 625 | 441 |
| 16 | 937 | 701 | 478 |
| 17 | 683 | 718 | 720 |
| 18 | 694 | 740 | 751 |
| 19 | 765 | 868 | 896 |
| Comparative | | | |
| 20 | not densified | — | — |
| 21 | 743 | 496 | 317 |
| 22 | 812 | 485 | 348 |
| 23 | 804 | 390 | 293 |
| 24 | 940 | 584 | 356 |

| Sample No. | Fracture Toughness at Room Temp. (MPa · m$^{1/2}$) | Creep Test at 1300° C. (Time (hr) taken until broken) | |
|---|---|---|---|
| | | 400 MPa | 600 MPa |
| Inventive | | | |
| 12 | 6.5 | 3 | — |
| 13 | 8.7 | not broken* | 2 |
| 14 | 8.9 | not broken* | 6 |
| 15 | 8.5 | 112 | — |
| 16 | 5.0 | 86 | — |
| 17 | 6.8 | not broken* | 79 |
| 18 | 8.0 | not broken* | 118 |
| 19 | 8.2 | not broken* | 168 |
| Comparative | | | |
| 20 | — | — | |
| 21 | 8.3 | broken immediately | — |
| 22 | 8.0 | broken immediately | — |
| 23 | 8.2 | broken immediately | — |
| 24 | 8.6 | broken immediately | — |

Note:
*Not broken even after 200 hr.

As seen from Table 6, any of the composite sintered bodies containing the rare earth oxide outside the scope of the present invention showed a poor 3-point bending strength at 1400° C., as compared with the composite sintered bodies which showed a 3-point bending strength higher than 400 MPa at 1400° C.

Further, it was confirmed that the composite sintered body of Sample No. 19 had a crystalline phase consisting, by area ratio, of 46% of β-phase silicon nitride, 29% of β-phase silicon carbide, 23% of α-sialon phase and 2% of grain boundary phase.

Next, the three-point bending test and the creep test (1300° C./600 MPa) were conducted in the same manner as above to examine the effect of addition amount of the SiC. The test samples had the same chemical composition as that of Sample No. 9, except for replacing a part of $Si_3N_4$ with SiC. The results are shown in Table 7.

TABLE 7

| $Si_3N_4$ | SiC | $Lu_2O_3$ | AlN | 3-Point Bending Strength at 1400° C. (MPa) | Creep Test (1300° C./600 MPa) (Time (hr) taken until broken) |
|---|---|---|---|---|---|
| 80.3 | 4.2 (5)* | 12.5 | 3 | 820.0 | 115 |
| 71.8 | 12.7 (15)* | 12.5 | 3 | 882.0 | 152 |
| 59.1 | 25.4 (30)* | 12.5 | 3 | 896.0 | 168 |
| 50.7 | 33.8 (40)* | 12.5 | 3 | 792.0 | 110 |
| 42.3 | 42.2 (50)* | 12.5 | 3 | not densified | — |

Note:
*Weight % based on total amount (100 wt %) of $Si_3N_4$ and SiC.

As seen from Table 7, when the amount of SiC exceeded the range of the present invention (5–40 weight % based on the total amount of $Si_3N_4$ and SiC), the resultant composite sintered body was not densified. When the amount of SiC was less than 5 weight % of the total amount of $Si_3N_4$ and SiC, the high-temperature strength was not improved as compared with Sample No. 9. Further, from the comparison of the creep test results of Sample No. 9 and Table 7, it is clear that the addition of SiC remarkably improved the creep characteristics.

As described in detail above, the composite sintered body of the present invention produced by sintering, preferably by HIP sintering a green body comprising silicon nitride, silicon carbide, aluminum nitride and a particular rare earth oxide has a nano-composite structure in which fine SiC particles are dispersed in $Si_3N_4$ particles and grain boundaries and, in some cases, fine $Si_3N_4$ particles are dispersed in SiC particles. The composite sintered body of the present invention also has a crystalline phase comprising a β-phase silicon nitride, a β-phase silicon carbide, an α-sialon phase and a grain boundary phase containing rare earth elements. Due to such structures, the composite sintered body of the present invention has a high density and an excellent high-temperature strength. In addition, since the added SiC controls the growth of crystalline particles, the resistance to creep rupture, is also improved. Therefore, the sintered body of the invention is suitable for applications exposed to high temperatures, such as gas turbine components, sliding members, etc.

What is claimed is:

1. A silicon nitride sintered body formed by sintering a mixture of silicon nitride powder, aluminum nitride powder and a powder of at least one rare earth oxide selected from the group consisting of $Ce_2O_3$, $Pr_2O_3$, $Nd_2O_3$, $Dy_2O_3$, $Ho_2O_3$, $Er_2O_3$, $Tm_2O_3$, $Yb_2O_3$ and $Lu_2O_3$.

2. The silicon nitride sintered body according to claim 1, wherein the amount of said aluminum nitride powder is 0.5–10 weight % and the amount of said rare earth oxide powder is 2–20 weight %, both of said weight percentages being based on the total amount of said silicon nitride powder, said aluminum nitride powder and said rare earth oxide powder.

3. The silicon nitride sintered body according to claim 1, having a bending strength of at least 400 MPa at 1400° C.

4. The silicon nitride sintered body according to claim 1, having a fracture toughness of at least 5 $MPa.m^{1/2}$ at room temperature.

5. An article of manufacture for use at 1200° C. or higher temperature, composed of a silicon nitride sintered body formed by sintering a mixture of silicon nitride powder, aluminum nitride powder and a powder of at least one rare earth oxide selected from the group consisting of $Ce_2O_3$, $Pr_2O_3$, $Nd_2O_3$, $Dy_2O_3$, $Ho_2O_3$, $Er_2O_3$, $Tm_2O_3$, $Yb_2O_3$ and $Lu_2O_3$.

6. A composite sintered body of silicon nitride and silicon carbide formed by sintering a mixture of silicon nitride, silicon carbide, aluminum nitride and at least one rare earth oxide selected from the group consisting of $Ce_2O_3$, $Pr_2O_3$, $Nd_2O_3$, $Ho_2O_3$, $Er_2O_3$, $Tm_2O_3$, $Yb_2O_3$ and $Lu_2O_3$.

7. The composite sintered body according to claim 6, wherein the crystalline phase of said composite sintered body consists essentially of β-phase silicon nitride, β-phase silicon carbide, α-phase sialon and grain boundary phase containing at least one rare earth element selected from the group consisting of Ce, Pr, Nd, Ho, Er, Tm, Yb and Lu.

8. The composite sintered body according to claim 7, wherein said crystalline phase consists essentially, by area ratio, of 40–93% of β-phase silicon nitride, 5–40% of β-phase silicon carbide, 1–50% of one of α-phase sialon and 0.5–10% of grain boundary phase.

9. The composite sintered body according to claim 6, having a bending strength of at least 400 MPa at 1400° C.

* * * * *